United States Patent [19]
Withers et al.

[11] Patent Number: 4,652,926
[45] Date of Patent: Mar. 24, 1987

[54] SOLID STATE IMAGING TECHNIQUE

[75] Inventors: Richard S. Withers; Richard W. Ralston, both of Bedford; Ernest R. Stern, Concord, all of Mass.

[73] Assignee: Massachusetts Institute of Technology, Cambridge, Mass.

[21] Appl. No.: 602,938

[22] Filed: Apr. 23, 1984

[51] Int. Cl.[4] .............................................. H04N 3/14
[52] U.S. Cl. .................................... 358/213; 358/909; 358/209
[58] Field of Search ............... 358/213, 212, 209, 906, 358/909, 335, 338; 250/578, 213 A; 357/24 LR, 23.5; 365/215, 234, 114, 112, 106, 115

[56] References Cited

U.S. PATENT DOCUMENTS

| | | | |
|---|---|---|---|
| 3,145,368 | 8/1964 | Hoover, Jr. | 365/215 |
| 3,763,476 | 10/1973 | Wilson et al. | 365/115 |
| 3,855,583 | 12/1974 | Gudmunosen | 365/114 |
| 4,022,968 | 5/1977 | Keizer | 358/338 |
| 4,128,897 | 12/1978 | Norton et al. | 365/118 |
| 4,213,148 | 7/1980 | Clemens | 358/338 |
| 4,224,481 | 9/1980 | Russell | 365/215 |
| 4,296,478 | 10/1981 | Kiess et al. | 365/112 |
| 4,326,282 | 4/1982 | Verboom et al. | 369/48 |
| 4,396,996 | 8/1983 | Oldham | 365/95 |
| 4,420,773 | 12/1983 | Toyoda et al. | 358/335 |
| 4,489,351 | 12/1984 | D'Alayer de Costemore | 358/213 |
| 4,498,156 | 2/1985 | Pizzarello | 365/215 |
| 4,527,259 | 7/1985 | Watanabe | 365/189 |

Primary Examiner—Robert G. Lev
Attorney, Agent, or Firm—Robert F. O'Connell

[57] ABSTRACT

An optical imaging system for use as a solid-state camera, for example, which includes a plurality of solid-state elements for providing long-term storage of images, such elements being, for example, MNOS chips having a plurality of storage cells, which chips when exposed to an image focussed thereon can store a representation thereof. The chips are at a later time optically addressed, as by a scanning-light beam, to read out the stored image so as to provide an electrical output representing the stored image, such output being usable to provide a visual representation of the image such as on a display screen or in hard copy form.

14 Claims, 10 Drawing Figures

SOLID STATE IMAGING TECHNIQUE

The Government has rights in this invention pursuant to Contract Number AF19628-80-C-0002 awarded by the Air Force.

INTRODUCTION

This invention relates generally to the storing and retrieval for subsequent reproduction of optical images and, more particularly, to techniques for performing such operations utilizing solid state devices.

BACKGROUND OF THE INVENTION

The use of solid state devices has been suggested for storing and for subsequent retrieval and reproduction of optical images as in a solid state camera. One such proposed system utilizes a miniaturized electronic camera and a magnetic disk or tape storage unit which can be packaged as a hand-held or shoulder-supported apparatus. The electronic camera utilizes a conventional charge-coupled device (CCD) imaging chip, the CCD thereon containing an array of pixels and the chip being located in the focal plane of the camera optics. The chip is exposed to the image and photocarriers are produced in each pixel. For reading the image, special electronic shifting circuits are used to shift the photocarriers on a line-by-line, and subsequently a pixel-by-pixel, basis to an output detector. The output detector signal is then stored on a video disk or video tape, for example, and the camera is then ready for the next imaging process. Because CCDs provide only very short term storage, the shifting process must begin substantially immediately after the image has been stored and must be completed within a relatively short time interval, i.e., one which is much less than one second if the quality of the image is to be preserved. If the shifting takes longer the quality of the image stored in the CCD device gradually diminishes and the image ultimately disappears.

Such an approach requires relatively elaborate electronic switching and shifting circuitry and the attachment of a magnetic recording device to the hand-held camera. Accordingly the device becomes relatively bulky and heavy and inconvenient to carry. As mentioned above, because the image that is stored in the CCD chip has a very short storage life, each image must be read out and stored in the magnetic recording device within a very short time after the chip has been exposed to the external image, in practice almost immediately, and the next image cannot be obtained until the overall switching, shifting and permanent storage recording process for a previous image has been completed.

In contrast it would be preferable to provide for solid state imaging in which images can be stored for much longer periods of time so that each image need not be accessed immediately for processing but rather many images can be stored in an array of solid state chips and then processed at a later time. Moreover, it would be desirable to avoid the need for an on-site magnetic storage device and for the elaborate electronic switching and shifting circuitry within the camera for reading out the image which has been formed and is to be stored. Currently there is no known solid state camera which provides such advantages.

BRIEF SUMMARY OF THE INVENTION

This invention provides a solid state camera in which several images can be stored for an extended period of time in an array of solid state devices so that the processing of images need not be performed in the field at the time when the image has originally been stored but can be processed at a much later and more convenient time period when all of the images in an array thereof can be processed together. Moreover, in accordance with the invention the system utilizes a read-out mechanism which permits the stored image to be read out optically so that complex electronic switching and shifting circuitry conventionally required is eliminated. In a particular embodiment, for example, the read-out process can be performed by utilizing a scanning optical beam which utilizes known, reliable electronic or mechanical scanning techniques.

Each of the solid state devices, or imaging chips, of the array thereof can be suitably moved sequentially into the camera's focal plane so that the image can be projected onto the focal plane for storage in the particular chip which has been moved into position. In a preferred embodiment, when all the chips of an array have been exposed to images, the substrate containing the array of chips can be appropriately read out by a device which is separate from the camera itself and which is capable of providing output image information for any appropriate use, such as to produce a print thereof or to store such output in the form of electrical signals on a video recording medium which can be appropriately displayed on a TV display system, for example. The imaging chips may be erased, either singly or collectively, by the application of a voltage pulse at some convenient time, e.g. just prior to exposure.

DESCRIPTION OF THE INVENTION

The invention can be described in more detail with the help of the accompanying drawings wherein FIG. 1 shows a plan view of an exemplary substrate containing an array of appropriate solid state imaging chips;

Figure 1:
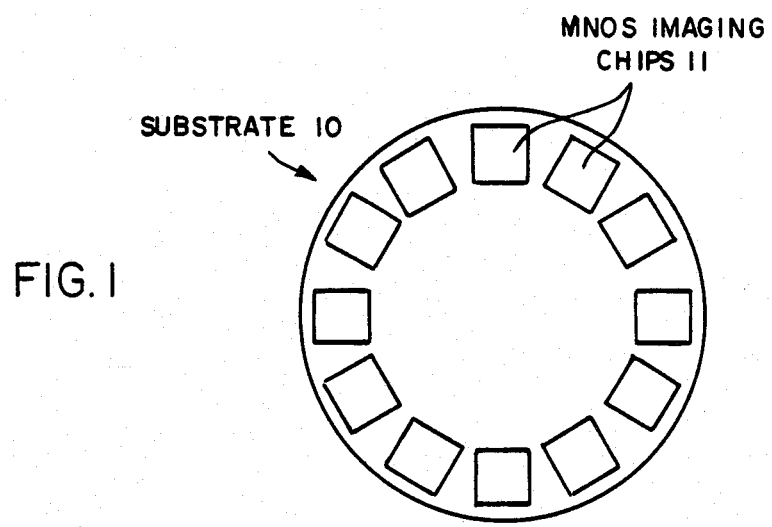

In one exemplary embodiment of the invention, as can be seen in FIG. 1, a substrate 10 carries a plurality of adjacent MNOS imaging chips 11 formed therein, each of said chips being utilized for storing a separate image as explained in more detail below. In a particular embodiment the substrate 10 may be circular in its plan view with adjacent chips 11 arranged near the outer periphery thereof. The substrate can then be mechanically rotated, for example, so that each chip can be sequentially placed in the focal plane of an optical imaging system. Alternatively, imaging chips may be arrayed in rows and columns on a rectangular substrate, for example, and a bidirectional (X-Y) drive circuit can be used to place the chips in the focal plane of an optical imaging system so as to more efficiently utilize all portions of the substrate.

In accordance with a preferred embodiment of the invention, each of the chips may be formed of metal-nitride-oxide-silicon (MNOS) cells which are formed in a suitable array thereof on each chip. Such cells may be formed in rows and columns on each chip, for example, each cell representing a pixel of the overall image stored on the chip.

MNOS cells of the type proposed for use in the invention have been described in U.S. Pat. No. 4,313,178, issued on Jan. 26, 1982 to E. Stern et al. Briefly, as described in such patent, an MNOS cell is a solid state device which is capable of providing long-term storage of analog signals. Thus, input analog signals (e.g., optical images) can effectively be permanently stored in the array of MNOS cells for subsequent readout and processing. In such MNOS devices analog signals can be stored for time periods up to several days and even a week or more in contrast to storage time of about 100 milliseconds, or less, with CCD devices.

Figure 2:
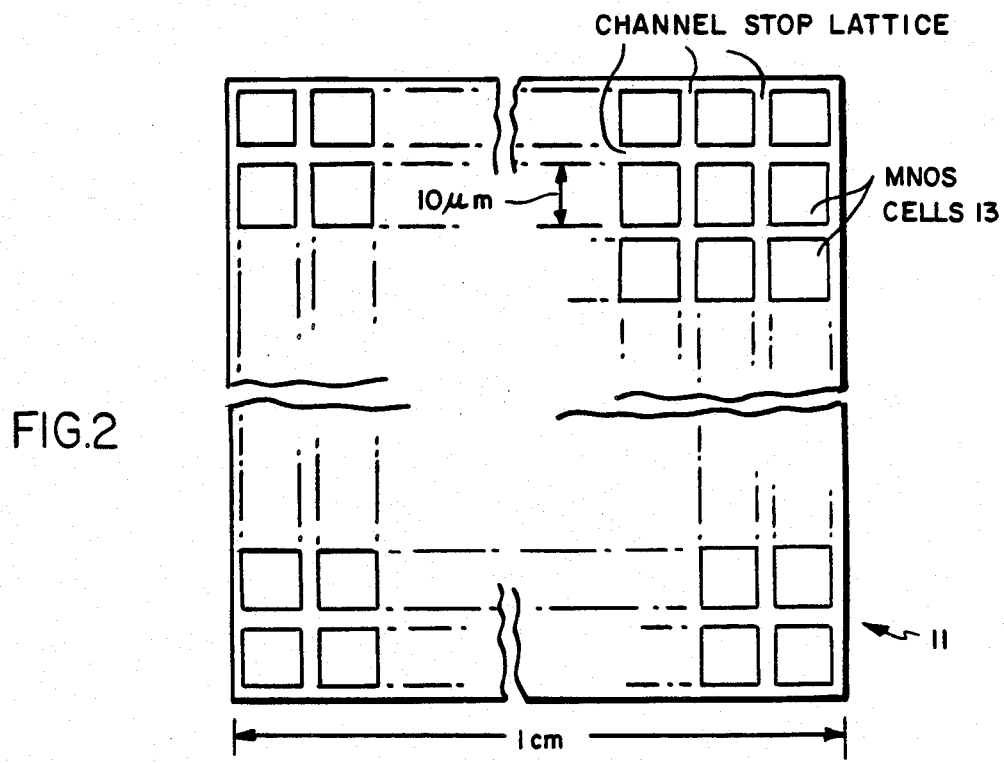
FIG. 2 shows a plan view of an exemplary chip having a plurality of appropriate solid state cells for forming each of the pixels of a complete image.

An exemplary chip, for example, is formed as an array of rows and columns of MNOS cells 13 as shown in FIG. 2. In contrast with the use of arrays of charge-coupled devices (CCDs) a minimum of two electrical leads are required for operation of the MNOS cells. One electrical contact provides an appropriate excitation voltage (V) while the other provides an effective ground contact to the cells as can be seen more clearly in FIG. 3 discussed below. The voltage may be applied to each of the cells via an optically transparent, electrically conductive electrode layer which may be formed of a very thin layer of metal (e.g., chromium) or a layer of electrically conductive polysilicon on the upper surface of the chip. The transparent electrode layers of each of the chips of the substrate can be appropriately interconnected to each other and thence to an electrical contact terminal suitably placed on one surface of the substrate 10. Such contact can be connected to a suitable voltage source (not shown in FIG. 2 but shown in FIG. 3, for example). A ground contact can also be formed on the opposite surface of the chips and interconnected on the substrate in contact with the lower surface of each of the MNOS cells and connected via a suitable terminal to electrical ground, (not shown in FIG. 2 but shown in FIG. 3, for example). To provide a practical idea of the chip dimensions, for example, in the exemplary embodiment depicted in FIG. 3 the chips can be 1.0 cm. square, each of the solid state cells being about 10 micrometers square.

Figure 3:
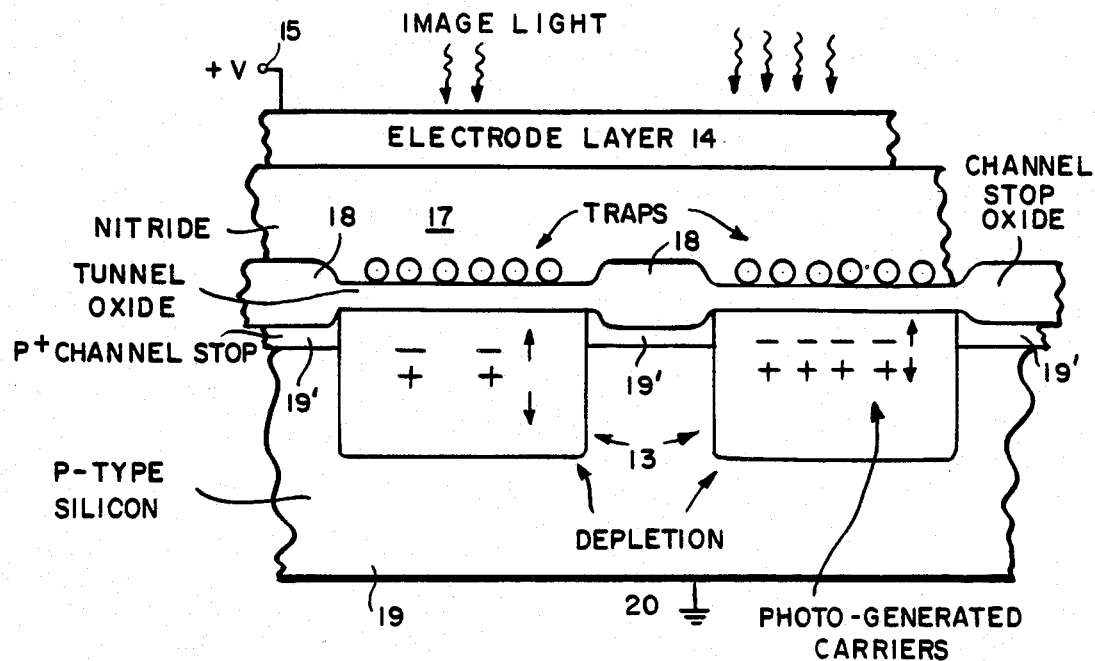
FIG. 3 shows a diagrammatic view in cross-section of a pair of adjacent solid state cells useful in explaining the image storing operation therein.

FIG. 3 shows in diagrammatic (and idealized) form a pair of exemplary adjacent MNOS cells 13, the metal contact terminal 15 providing a voltage V which is supplied to an electrode layer 14 associated with the cells. The electrode layer is in turn in contact with a nitride layer 17 which is above an oxide layer 18 which is above a silicon layer 19 (e.g. a p-type silicon) to form an MNOS image storage cell, as discussed in detail in the above-mentioned Stern et al. patent. Suitable P+ channel stop regions 19' can be formed in the silicon layer between cells in order to isolate the cells and to prevent migration of charges between cells as discussed in the Stern et al. patent. The silicon layer is shown as p-type although operation with n-type silicon is possible. While the device in the patent utilizes a chromium-gold electrode 14, such electrode layer may also be in the form of a transparent electrode layer of electrically conductive polysilicon material, the thickness thereof being designed to pass a selected primary color for use in storing color images. Color images may also be formed by the use of a color filter mask which passes the primary colors to appropriate groups of storage cells or by the use of separate chips for each primary color. A suitable ground connection 20 is made to the silicon layer.

The process for storing photocarriers so as to store a representation of an image is described in detail in the Stern et al. patent. Briefly, the positive potential (+V) applied to each electrode layer depletes the region beneath the electrode of majority carriers. Input image light, as from a scene, for example, is permitted to fall on the overall MNOS chip array (FIG. 3) and photons absorbed in the depleted region of each cell create pairs of photo-carriers. The holes are swept into the bulk material and the electrons accumulate beneath the surface, causing the electric field in the oxide layer to increase and consequently causing the electrons to tunnel through the oxide layer into the trap sites shown within the nitride layer near the oxide-nitride interface where they can remain for a relatively long period of time. Accordingly, an image of the scene is effectively stored on a substantially permanent basis in the solid state dual dielectric structure. Such storage process is essentially a solid state equivalent of a photographic film.

Figure 4:
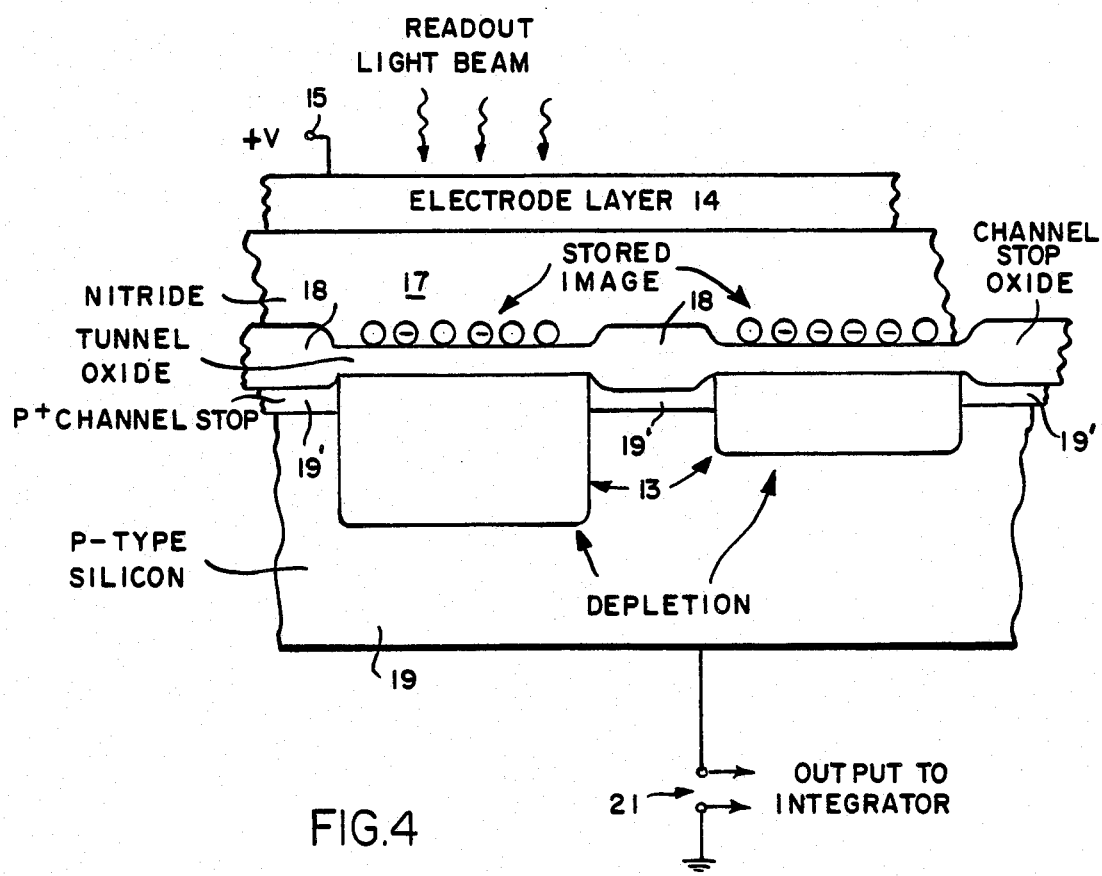
FIG. 4, shows a diagrammatic view in cross-section of a pair of adjacent solid state cells useful in explaining the optical readout operation thereof.

Once an image has been so stored, the image can be optically read out in accordance with the invention by the use of an optical (light) beam ( e.g., such as supplied by a flying spot scanner) as illustrated in FIG. 4, in contrast with the electrical read-out technique disclosed in the Stern et al. patent. The positive potential(+V) is applied as in the imaging storage process. As indicated in the Stern et al. patent, and as illustrated diagrammatically in the figures, the depth of the depleted region is inversely proportional to the stored charge (i.e., the lower the charge in the stored image the larger the depletion depth).

Figure 6:
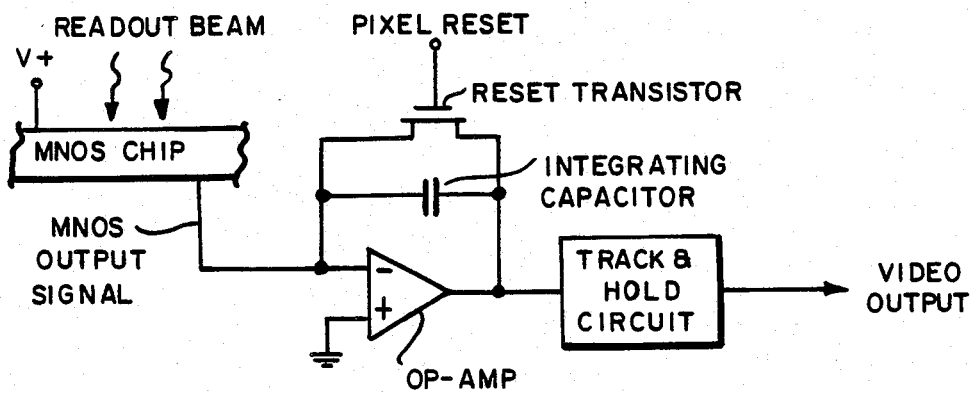
FIG. 6 shows an exemplary electrical integrating circuit for providing an output signal from an optically scanned imaging chip.

In accordance with the invention, it has been found that when the readout light beam, e.g., light from the scanner, falls upon a particular cell, photocarriers are created, as in the storage process, and the so generated electrons accumulate at the surface and screen the silicon substrate from the applied potential, thereby causing the depleted region to collapse. Blue light is preferred for this purpose as it is absorbed at a shallower depth and causes less discharge of adjacent cells. The intensity of the readout beam is of little importance as long as it is of sufficient intensity to completely discharge any cell, regardless of the stored charge, within the allotted dwell time. Collapse of a depleted region causes charge to flow into the base electrode in order to neutralize the acceptors in the collapsed depleted region. Accordingly, a read-out signal is now available at the output electrodes 21, the signal being inversely proportional to the charge due to the image portion stored in each cell. The output signal from each cell can be supplied to an integrator to produce an output which is linearly related to the total charge (i.e., the image intensity) in each cell. Suitable electrical integrator circuitry therefor is shown in FIG. 6 and is of essentially a well-known design. Such signal can then be utilized in a variety of ways in order to recreate the stored image. For example, the signal can be stored on a magnetic disk or tape and later supplied to a cathode ray tube or television imaging tube via appropriate circuitry or it can be used to produce hard copy images (prints).

After a time period on the order of 10 to 1000 milliseconds, dark currents in the MNOS chip cause significant collapse of the depletion layers. At this time the readout process may be halted temporarily, a negative pulse used to discharge the accumulated dark currents, and then the positive potential restored and readout resumed.

Such process and structure represents a novel imaging storage and readout technique in that it utilizes optical addressing of the stored image via, for example, an optical spot scanning beam in order to provide a charge from the electrically stored information which has been stored on a long term basis within each imaging cell. The electrical output which is obtained from such optical addressing process is linearly related to the stored input and can be used to provide a re-creation of the image in any of several well-known ways. Because the long term storage elements are of the type shown by the long-term MNOS image storage cells, for example, rather than short-term CCD storage elements suggested in prior image storage processes, this relatively slow optically-addressed readout method may be used. Only two electrical connections are required for each cell, the leads from each of the cells being appropriately interconnected as shown in FIG. 3, for example, so that only two electrical leads need to be utilized for the overall array of the chips. Furthermore, the patterns on the chip surface are few and simple. Such structure can be contrasted with a device using the CCDs which requires electrical readout techniques in which a larger number of separate leads and more numerous and complex patterns of metals, dielectrics, and doped regions are required for each chip in order to implement the more rapid signal readout with the complex switching and shifting operations utilized therein. The large number of metal lines required in such latter devices prevents the use of closely spaced CCD elements so that the density thereof, and the overall imaging resolution, is relatively low. In the invention, however, because of the need for only two electrical leads and simple patterns for each cell, the cells can be placed much closer together, the resulting high cell density on each chip providing an ultimate image which has much higher resolution.

It will be evident to those skilled in the art that the optically addressed output technique described may suffer to some extent from a degraded signal-to-noise ratio. Specifically, (1) dark current is collected from the entire chip, and (2) the large output capacitance reduces the signal energy with respect to thermal noise energy. If necessary for a given implementation, a compromise may be struck between noise performance and chip simplicity by dividing the chip area into rows, each of which is addressed sequentially during readout. Row address may be achieved electrically using field-effect-transistors (FETs) and associated decoding circuitry or optically using optoelectronic switches and a second readout beam. Pixel (or column) address is as described above.

As discussed above, MNOS devices can store images for relatively long periods of time, e.g., for several days or more. Other devices which are being developed can also be used. For example, floating gate devices as described in the article, R. S. Withers et al., "Nonvolatile Analog Memory: Floating-Gate Devices," *Solid State Research Quarterly Technical Summary,* Aug. 1 to Oct. 31, 1982, Lincoln Laboratory, M.I.T., ESD-TR-82-105, Nov. 15, 1982, pp 75–77, can also provide long term storage up to several weeks and even up to many months or more and can be optically addressed for read-out purposes. Accordingly, any suitable device for providing storage over an extended period of time which, as used herein, can mean a period of time ranging from several seconds to several months or more, can be used in the invention.

Figure 5:
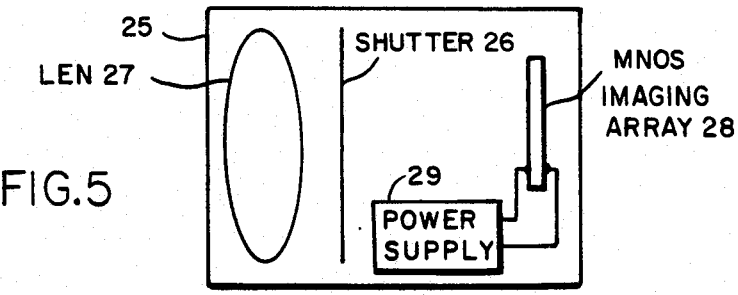
FIGS. 5 and 5A show diagrammatic views of an exemplary embodiment of an overall camera apparatus and readout apparatus, respectively, of the invention depicting the locations of significant portions thereof.
Figure 5A:
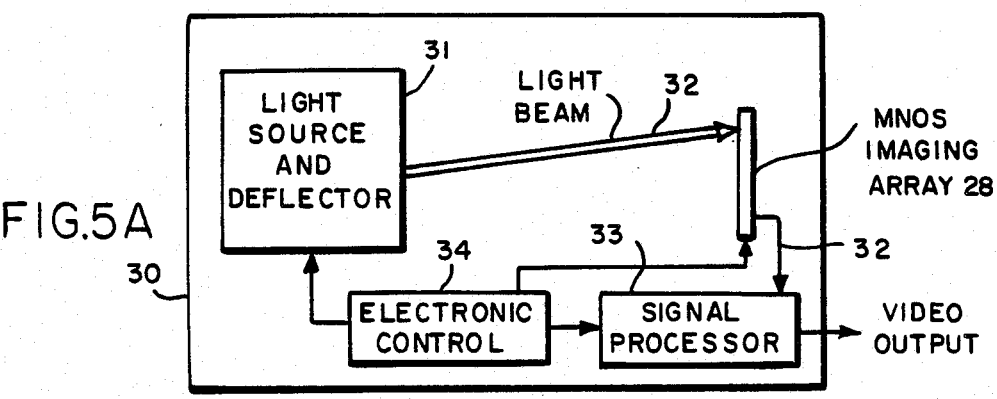

FIGS. 5 and 5A depict in diagrammatic form exemplary embodiments of an arrangement of elements required in exemplary solid state camera and readout devices, respectively, made in accordance with the invention. As can be seen therein, a camera enclosure 25 has an appropriate shutter mechanism 26 which supplies an image of an object via a suitable lens system 27 to an MNOS imaging storage chip array 28. A suitable power supply 29 supplies the desired voltage V. During the image storage operation when the shutter is open an image of the object is stored in an MNOS chip of the overall array thereof. The array of chips can be removed from the camera enclosure following storage of all the images thereon and placed in a separate read-out device which provides for the optical addressing and read-out of the images stored therein.

During the read-out operation, for example, an appropriate optical read-out illuminator 31 utilizing a light source and deflector to provide suitable flying spot scanning operation, the structure of which would be well known to those in the art, supplies a light beam 32 which is used to scan, i.e. to optically address, each of the MNOS chips of the array 28 for readout purposes. The output electrical signal 32 which results can then be utilized in whatever manner is desired, e.g., for storage on a video disk or tape, for supply to the image display circuitry of a cathode ray tube or for use in providing a hard copy of the image. The MNOS chip may be electrically erased, as described in the above Stern et al. patent, and reused. In FIG. 5A the signal 32 can be suitably processed via signal processor circuitry 33, in accordance with techniques well known to the art, to format the output into a standard video output signal format, for example. Appropriate and well-known electronic control circuitry 34 is used to coordinate the operation of the light beam source and the MNOS array, as would also be well known to the art.

Figure 5B:
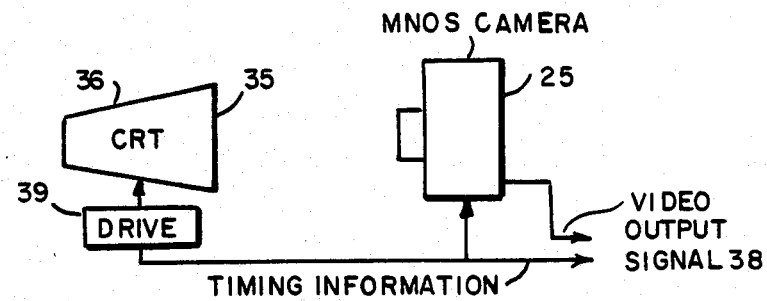
FIG. 5B shows a block diagram of an alternative readout apparatus using a cathode ray tube.

The function of the optical scanning beam may be relatively inexpensively achieved in a particular embodiment by using the camera optics itself to project a spot from a cathode ray tube onto the MNOS chip to be read out. If the screen 35 of a CRT 36 is placed in the focal plane of the MNOS camera 25, as shown in FIG. 5B, and if a single bright spot is made, by simple electronic means, to scan in a raster across the screen, a corresponding spot will scan the MNOS chip. The resulting video output signal 38 from the chip, along with appropriate timing information from the CRT drive circuitry 39, may be supplied to an image storage, image display, or other image reproduction device.

Thus a single optical read-out device can be used with an unlimited number of separate image storage cameras. The read-out device, for example, may be located at a store where the camera user takes the exposed substrate and receives appropriate hard copy prints, for example. Alternatively, each user may have his own separate optical read-out device which permits him to read out the chips at his convenience to provide an optical display thereof on a cathode ray tube (TV tube), for example, or to make his own hard copy prints. In accordance with such embodiments the camera itself can have a very compact structure and can be easy to carry and to use.

Figure 7:
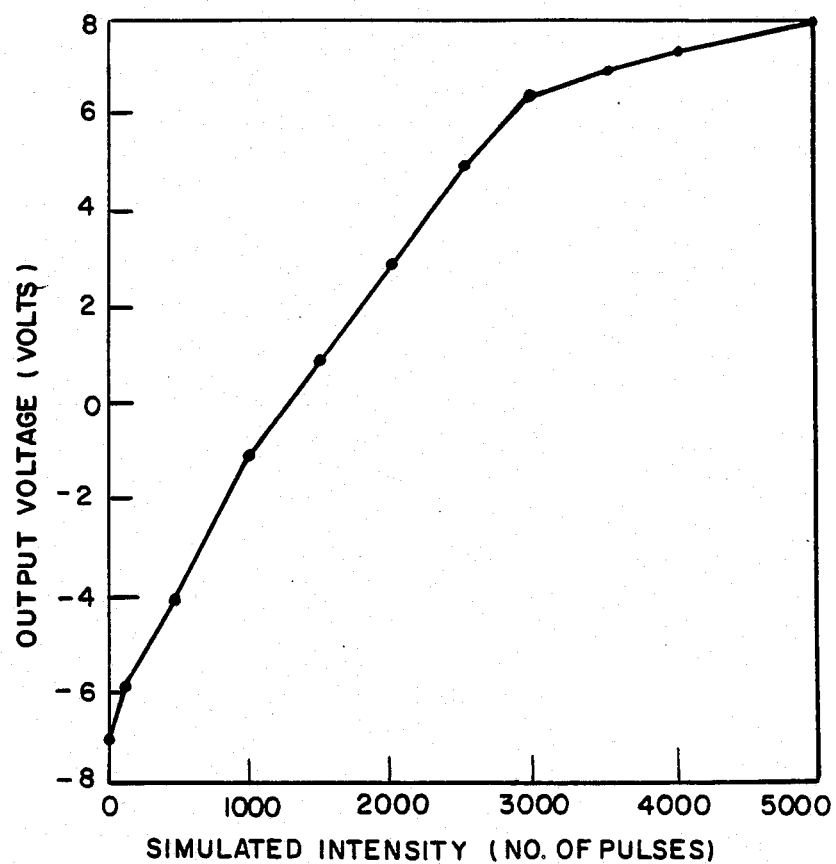
FIGS. 7 and 7A show curves representing outputs from an exemplary imaging cell read by known electrical readout techniques and read by the optical readout technique of the invention, respectively.
Figure 7A:
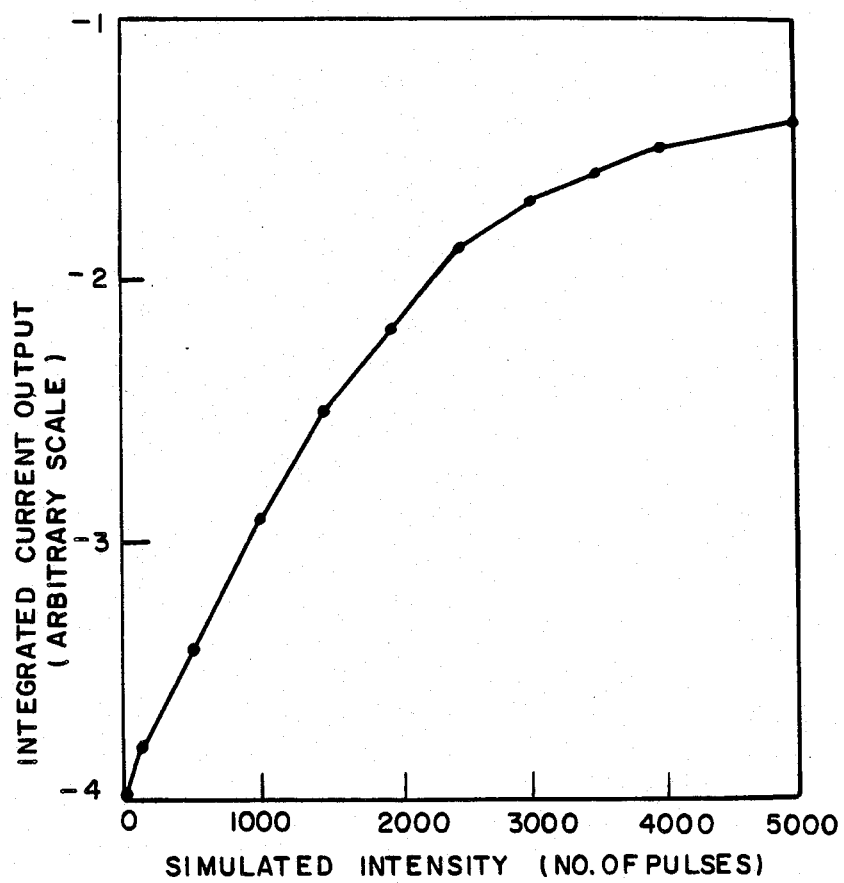

The use of an optical light beam for optically addressing each MNOS chip has not been suggested by any previously proposed imaging systems. However, it has been found that such optical addressing technique in accordance with the invention provides accurate read out results comparable to those obtained through the use of previously proposed more complex electrical read-out techniques, as shown by FIGS. 7 and 7A. In FIG. 7, a typical curve is shown demonstrating the relationship between the voltage readout from an MNOS cell utilizing an electrical addressing and read-out process as described, for example, in the above Stern et al. patent, as a function of the input image intensity thereto. Such a curve can be obtained for testing purposes, for example, by simulating the image intensity in an MNOS cell in accordance with the number of input optical pulses of light which are applied thereto (i.e., the greater the number of such pulses, the greater the simulated intensity). The output voltage, which is proportional to the charge stored, is shown as a function of different intensities (i.e., different numbers of pulses) applied to the cell.

FIG. 7A shows the output as a function of simulated image intensity (i.e. numbers of pulses) wherein the output represents the integrated current output for the cell when utilizing optical addressing of an optical light beam to read out the stored charge in accordance with the invention. Such process provides a current output as discussed above which is then integrated to produce a voltage output once the entire charge stored therein has been discharged. As can be seen, the curve in FIG. 7A essentially matches the curve in FIG. 7, the scaling of the current integrated output being arbitrary depending on whatever scale factor is used. Thus FIG. 7A shows that the use of an optical scanning beam to address the MNOS cells in order to read out the stored information provides as accurate a representation of the stored charge representing the input image as does the more complex and cumbersome electrical read-out process described in the previously issued Stern et al. patent.

While the particular embodiments of the invention described above represent preferred embodiments thereof, modifications thereof may occur to those in the art within the spirit and scope of the invention. For example, although the camera and read-out devices are described as normally being physically separate units, it may be desirable in some applications to integrate them into a single physical unit in which they are either inseparably constructed or in which they can be separated or joined, as desired. Hence, the invention is not to be construed as limited to the particular embodiments disclosed herein except as defined by the appended claims.

What is claimed is:

1. An optical imaging system comprising
   at least one solid state element comprising an electrode, one or more dielectric regions, and one or more semiconductor regions each of which has the same conductivity type and one of which can be depleted of mobile charges, said solid state element further having a plurality of storage cell for storing an optical image as a charge in each of said plurality of storage cells;
   means for focusing an optical image on said solid state element, said optical image thereby being stored therein;
   means which includes an integrating means for optically scanning said solid state element to read out said stored image so as to provide an electrical output which is linearly related to the total charge in each said storage cell and represents said stored image.

2. An optical imaging system in accordance with claim 1 wherein said system includes
   a plurality of said solid solid state elements, each capable of storing an optical image; and further wherein
   said focusing means sequentially focuses separate optical images on separate ones of said plurality of solid state elements, said separate optical images thereby being separately stored in said separate ones of said solid state elements; and
   said optical scanning means sequentially scans each of said solid state elements to read out the separately stored images therein so as to provide a plurality of electrical outputs each representing one of said separate stored images.

3. An optical imaging system in accordance with claim 1 and further including means responsive to said electrical output for providing a visual reproduction of said optical image.

4. An optical imaging system in accordance with claim 1 and further including
   means for storing said electrical output;
   means for retrieving said stored electrical output from said storing means; and
   means responsive to said retrieved electrical output for providing a visual reproduction of said optical image.

5. An optical imaging system in accordance with claim 1 wherein said solid state element comprises a MNOS chip having a plurality of storage cells.

6. A system in accordance with claim 1 wherein said optical scanning means includes an electron beam scanning means.

7. An optical imaging system in accordance with claim 6 wherein said electron beam scanning means comprises means for providing a scanning electron beam for producing an optical output on the screen of a cathode ray tube and means for focusing said optical output from said cathode ray tube on said at least one solid state element.

8. An optical imaging system in accordance with claim 4 wherein said electrical output storing means is a magnetic storage means.

9. An optical imaging system in accordance with claim 1 wherein said at least one solid state element is capable of storing an optical image for an extended period of time.

10. An optical imaging system in accordance with claim 9 wherein said extended period of time can extend up to many months.

11. An optical imaging system in accordance with claim 1 wherein said optically scanning means includes
    means for providing a signal from each said storage cell which is inversely proportional to the charge stored therein; and means, which includes said integrating means, responsive to the signal from each said cell for providing said electrical output.

12. An optical imaging system in accordance with claim 1 wherein said intergrating means is an electrical integrator circuit.

13. An optical imaging system in accordance with claim 1 wherein said optical scanning means is a light scanning means.

14. An optical imaging system in accordance with claim 13 wherein the light from said light scanning means is blue light.

* * * * *